United States Patent
Denda et al.

(10) Patent No.: US 6,744,701 B2
(45) Date of Patent: Jun. 1, 2004

(54) INFORMATION REPRODUCTION APPARATUS AND METHOD FOR ERASING PROGRAM DATA

(75) Inventors: Akihiro Denda, Saitama (JP); Yoshiya Nonaka, Saitama (JP)

(73) Assignee: Pioneer Corporation, Tokyo (JP)

( * ) Notice: Subject to any disclaimer, the term of this patent is extended or adjusted under 35 U.S.C. 154(b) by 293 days.

(21) Appl. No.: 10/091,028

(22) Filed: Mar. 6, 2002

(65) Prior Publication Data

US 2002/0126553 A1 Sep. 12, 2002

(30) Foreign Application Priority Data

Mar. 7, 2001 (JP) .................................. P. 2001-063733

(51) Int. Cl.[7] .............................................. G11B 21/08
(52) U.S. Cl. .............................. 369/30.07; 369/30.05; 369/30.19
(58) Field of Search ................... 369/30.07, 30.05, 369/30.08, 30.09, 30.18, 30.27, 84, 83, 30.19; 386/52, 54, 55, 64, 125, 126

(56) References Cited

U.S. PATENT DOCUMENTS

| | | | | |
|---|---|---|---|---|
| 4,656,535 A | * | 4/1987 | Usui | 369/47.23 |
| 4,817,075 A | * | 3/1989 | Kikuchi et al. | 369/30.08 |
| 5,051,973 A | * | 9/1991 | Shiba et al. | 369/30.06 |
| 5,546,365 A | | 8/1996 | Roth | |
| 5,864,528 A | * | 1/1999 | Ikeda et al. | 369/30.27 |
| 6,222,807 B1 | | 4/2001 | Min-Jae | |
| 6,512,722 B2 | * | 1/2003 | Kumagai | 369/30.05 |
| 6,515,944 B1 | * | 2/2003 | Yoshida et al. | 369/30.23 |

FOREIGN PATENT DOCUMENTS

| | | |
|---|---|---|
| EP | 0 399 853 A2 | 11/1990 |
| EP | 1 143 720 A1 | 10/2001 |
| EP | 1 148 505 A2 | 10/2001 |
| WO | WO 02/25610 A1 | 3/2002 |

OTHER PUBLICATIONS

Japanese Abstract No. 11259971, dated Sep. 24, 1999.

* cited by examiner

Primary Examiner—Tan Dinh
(74) Attorney, Agent, or Firm—Sughrue Mion, PLLC

(57) ABSTRACT

In an information reproduction apparatus, a recording/reproducing unit reproduces a plurality of program data on a recording medium. The program data and identification information for the program data are stored on the recording medium. An operation/display unit displays the identification information and reproduction frequency information, and allows an user to select one of the program data to be deleted. A controller for controlling the recording/reproducing unit in accordance with an instruction from the operation/display unit. The controller calculates the reproduction frequency information for each of the program data by employing a variety of information obtained by reproducing each of the program data. The controller controls the recording/reproducing unit to erase from the recording medium the program data identified by the operation/display unit.

21 Claims, 5 Drawing Sheets

INFORMATION REPRODUCTION APPARATUS AND METHOD FOR ERASING PROGRAM DATA

BACKGROUDND OF THE INVENTION

1. Field of the Invention

The present invention relates to an information reproduction apparatus and to a method for erasing program data. In particular, the present invention relates to an information reproduction apparatus that provides, for a user, information for requesting a user to select program data to be erased from a large capacity recording medium, such as a hard disk.

2. Description of the Related Art

Information reproduction apparatuses are presently available that record, and reproduce, program data on large capacity recording media, such as hard disks. When fitted with a hard disk, by employing a variety of formats one of these information reproduction apparatuses can be used to compress program data stored as music content on a recording medium, such as a CD, and to load the compressed data on the hard disk for later reproduction.

Current, typical compression methods include MP3 (MPEG: Moving Picture Experts Group; audio layer III) and ATRAC3, an improved version of ATRAC (Adaptive Transform Acoustic Coding) that when uses to process data requiring one minute to produce yields compressed data equivalent to a storage capacity of 1 M bytes. Thus, assuming that this compression method is employed for musical renditions having reproduction times of five minutes, and assuming that the hard disk in this case has a storage capacity of 10 G bytes, an information reproduction apparatus can record the data for 2000 pieces of music.

As is described above, an information reproduction apparatus for reproducing program data stored on a large capacity medium, such as a hard disk, can be usefully employed for recording a large quantity of program data.

However, since a large quantity of program data can be stored on a hard disk, unnecessary data, including music content that is seldom reproduced, may be retained for an extended period of time. Further, if unnecessary program data is permitted to accumulate, even when a large capacity recording medium is used a point will be reached at which a shortage of space precludes the further storage of data, including the latest music content.

To avoid the occurrence of this problem, a user must manipulate a predetermined key to erase from a hard disk program data such as unnecessary music content.

That is, in order to delete program data recorded on a hard disk, a user must first select an erase mode. The user must then manipulate a track select key, or a forward or backward key, to search for program data to be deleted; and when such program data is found, to erase that data from the hard disk the user must manipulate an execute key.

As is described above, in order to find program data for deletion from a hard disk, a user must search for the program data to be deleted through a large amount of data. Thus, when at first no relevant program data is found, the user must repeat the manipulation of the track select key, or of the forward or backward key, a process requiring the expenditure of a great deal of time and effort.

Further, when a shortage of hard disk capacity has occurred, the user cannot quickly delete unnecessary data to obtain additional free space, so that program data, such as the latest music content, can not be promptly recorded on the hard disk.

SUMMARY OF THE INVENTION

To resolve the shortcoming, it is an object of the present invention to provide an information reproduction apparatus and program data deletion method that calculates information to be used as an index for erasing program data such as reproduction frequency, to permit the user to efficiently select for deletion program data recorded on the hard disk.

To achieve this objective, according to the present invention, an information reproduction apparatus, for reproducing program data stored on a recording medium, comprises:

reproducing means for reproducing program data on a recording medium on which are stored the program data and identification information for the program data;

erasing means for erasing the program data from the recording medium;

reproduction frequency calculation means for calculating reproduction frequency information for each set of program data by employing a variety of information obtained by reproducing the program data; and control means for displaying, at the least, the identification information and the reproduction frequency information, and for erasing from the recording medium program data that has been identified by referring to the identification information selected by a user.

The variety of information includes reproduction time data, which is obtained by the addition of each set of program data each time the program data is reproduced by the reproducing means, and total reproduction time data, which is obtained by adding the reproduction time data.

The variety of information includes reproduction count data, which is obtained by the addition of data, for each set of program data, each time the program data is reproduced by the reproducing means, and total reproduction count data, which is obtained by adding the total reproduction count data.

The reproduction frequency calculation means employs the reproduction time data and the total reproduction time data to obtain a reproduction time ratio for each set of the program data.

The reproduction frequency calculation means employs the reproduction count data and the reproduction count total to obtain the reproduction count ratio for each set of the program data.

The reproduction time data and the reproduction count data are obtained by the incrementation of the program data up to the final position of it.

According to the thus arranged information reproduction apparatus of the invention, the reproduction frequency information is calculated for each set of program data by using a variety of information that is obtained (updated) when the program data is reproduced by the reproducing means. When the reproduction frequency information and the identification information for identifying the program data that are displayed on the display means, the user is requested to select the program data to be erased.

With this arrangement, the user need only visually confirm the reproduction frequency information to efficiently select the program data that are to be deleted.

Therefore, when a shortage of hard disk capacity has occurred, unnecessary program data can be immediately selected and deleted, and program data, such as the latest music content, can be promptly stored on the hard disk.

Further, since reproduction frequency information is obtained based either on the time whereat the program data was reproduced or the number of times whereat the program data was reproduced, appropriate information to be used as a determination reference for erasing data from the hard disk can be provided for the user.

In addition, to achieve the objective according to the invention, a method for erasing program data stored on a recording medium comprises the steps of:

reproducing program data to calculate a variety of information; and based on the variety of information, displaying on display means reproduction frequency information for each set of program data, and erasing from the recording medium program data that is selected by a user employing the reproduction frequency information.

According to the thus arranged program data erasing method of the invention, reproduction frequency information is calculated for each set of program data by using a variety of information that is obtained (updated) when the program data is reproduced by the reproducing means. After the reproduction frequency information and the identification information for identifying the program data have been displayed on the display means, the user is requested to select the program data to be erased.

With this arrangement, the user need only visually confirm the reproduction frequency information to efficiently select program data to be deleted.

Therefore, when for the hard disk a shortage of record capacity on the hard disk has occurred, unnecessary program data can be immediately selected and deleted, and program data, such as the latest music content, can be promptly stored on the hard disk.

DETAILED DESCRIPTION OF THE PRESENT INVENITON

Figure 1:
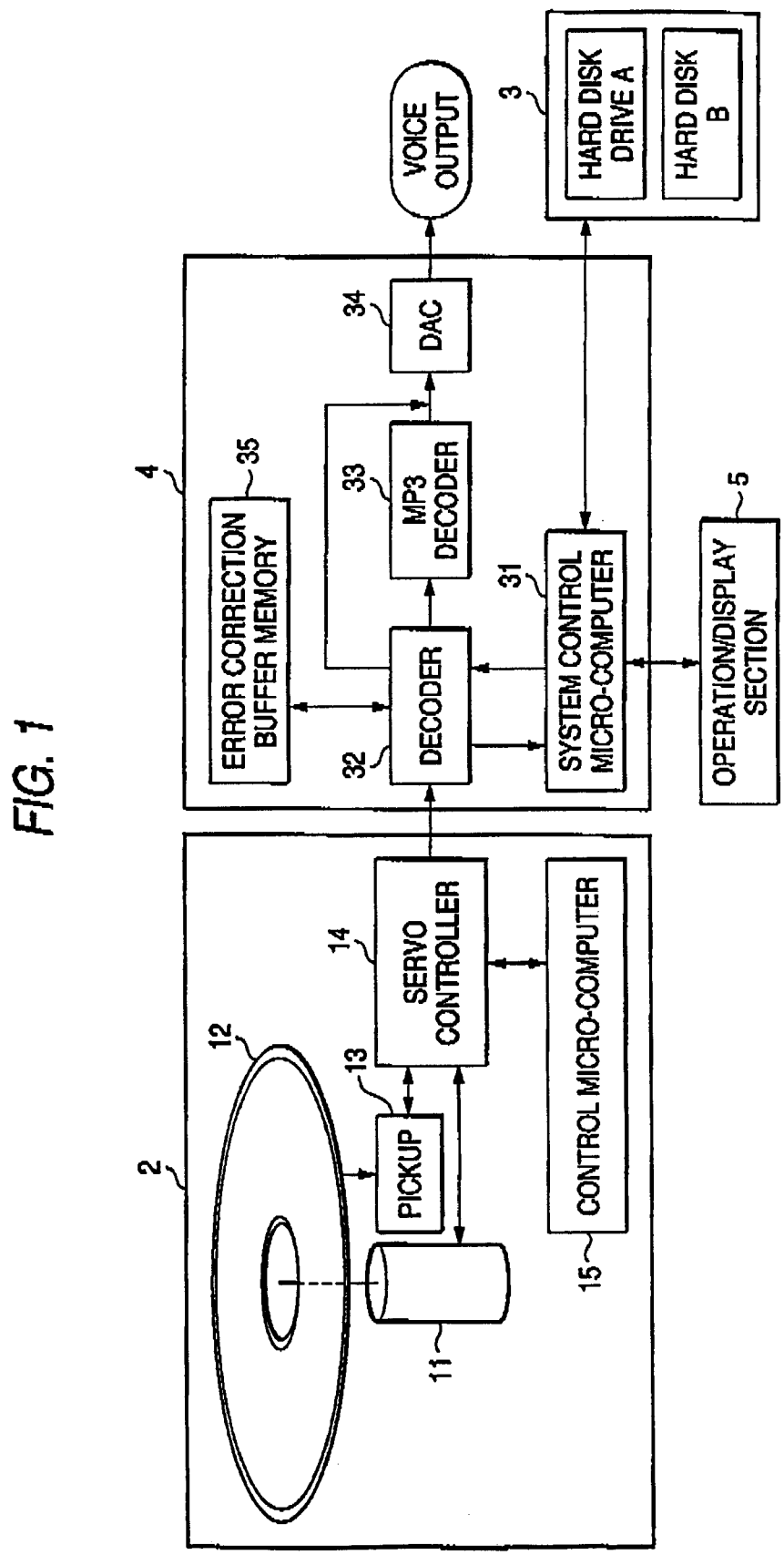
FIG. 1 is a block diagram showing one embodiment of the present invention.

The preferred embodiment of the present invention will now be described while referring to the accompanying drawings. First, the configuration of an information reproduction apparatus according to the embodiment of the invention will be described while referring to the block diagram in FIG. 1. In FIG. 1, an information reproduction apparatus 1 comprises: a reproduction section 2, for reproducing program data stored on a first recording medium (hereinafter referred to as an optical disc) 12, such as a CD, a CD-ROM or a DVD; a recording/reproduction section 3, for recording program data on a second recording medium (hereinafter referred to as a hard disk) or for reproducing the program data thereon; a control section 4, for controlling the reproduction section 2 and the recording/reproduction section 3, and for compressing or decompressing the program data reproduced by the recording/reproduction section 2 and 3; and an operation/displaying section 5, having an operation unit manipulated by a user and a display unit, such as a liquid crystal display panel.

The reproduction section 2 includes: a spindle motor 11, for rotating the loaded optical disc 12 at a predetermined linear speed; a pickup 13 for optically reading data on the optical disc 12 and converting the data into an electric signal, and for outputting the electric signal; a servo controller 14; and a control micro-computer 15.

The servo controller 14 processes the electrical signal output by the pickup 13, and generates an error signal, such as a tracking error signal or a focus error signal, and an RF signal. The servo controller 14 converts the RF signal into digital data, performs demodulation and error correction that conform to the data format of the optical disc 12, and transmits the obtained data to a decoder 32 provided for the control section 4.

Further, in accordance with an instruction from the control micro-computer 15, the servo controller 14 performs focus servo and tracking servo for the pickup 13 by using the error signal, such as a focus error signal or a tracking error signal, and a synchronous error signal obtained by demodulation and error correction. The servo controller 14 exercises servo control for the rotational speed of the spindle motor 11.

The servo controller 14 transmits, to the decoder 32, the data obtained by demodulation and error correction, and transmits, to the control micro-computer 15 and a system control micro-computer 31 provided for the control section 4, identification information recorded on the optical disc 12.

The identification information is TOC information recorded in the read-in area of a CD that serves as the optical disc 12. The TOC information is a reproduction condition, such as the reproduction time for program data, or a number (hereinafter referred to as a track number) provided in order to identify the program data. The servo controller 14 transmits the TOC information to the system control micro-computer 31.

The recording/reproduction section 3 includes a hard disk drive A and a hard disk B, which is an area for recording program data using the hard disk drive A. When program data is to be recorded on the hard disk B using the hard disk drive A, a storage area, such as a file folder, is formed to store the program data.

The control section 4 includes: the decoder 32, for decoding data that is obtained, through demodulation and error correction, by the servo controller 14 of the reproduction section 2 and is transmitted therefrom, or data reproduced from the hard disk drive A; an error correction buffer memory 35 in which data sets, which are obtained, through demodulation and error correction, by the servo controller 14 are temporarily stored and rearranged in a predetermined order; an MP3 decoder 33, for expanding the data (e.g., data obtained using MP3 method or ATRAC3 method; in this embodiment, MP3 is employed for the following explanation) that is compressed using a predetermined compression process; a DAC 34, for outputting the expanded data as digital data, or for converting the expanded data into analog data and outputting the analog data; and the system control micro-computer 31.

The system control micro-computer 31 includes a microprocessor (MPU), and executes a predetermined program to control the overall processing of the information reproduction apparatus 1. Upon receiving decoded data from the decoder 32, the system control micro-computer 31 compresses and converts the received data into data that conforms to the standard, such as ATRAC3. The system control micro-computer 31 controls the hard disk drive A for the recording of the obtained data on the hard disk B. At this time, the identification information for identifying the program data is also stored on the hard disk B in correlation with the program data.

The information reproduction apparatus 1 of this embodiment incorporates a calendar function (not shown). The system control micro-computer 31 confirms the calendar to correlate the program data with the information (hereinafter referred to as a recording date) for a date on which the program data was recorded on the hard disk B.

The operation/display section 5 includes: a display unit (not shown) for displaying, based on the display data received from the system control micro-computer 31, identification information, such as a track number, for identifying program data, and reproduction frequency information that will be described later; and an operation unit (not shown), provided for which are a recording instruction button that is manipulated to record, on the hard disk B, the program data stored on the optical disc 12, an erase button that is manipulated to erase the program data stored on the hard disk B, a select button that is manipulated to select a track number, and a source select button that is manipulated to select a source, such as the optical disc 12 or the hard disk B.

For the thus arranged information reproduction apparatus 1, when the user manipulates the recording instruction button of the operation unit that is provided for the operation/display section 5, the operation/display section 5 transmits an operation signal to the system control micro-computer 31, following which, to instruct data reproduction, the system control micro-computer 31 transmits a control signal to the control micro-computer 15.

In accordance with an instruction from the system control micro-computer 31, the control micro-computer 15 controls the servo controller 14. Upon receiving an instruction, the servo controller 14 drives the spindle motor 11 and the pickup 13 to reproduce program data recorded on the optical disc 12, and transmits the RF signal obtained from the optical disc 12 to the decoder 32 for the control section 4.

The decoder 32 transmits to the error correction buffer memory 35 data that is obtained, through demodulation and error correction, by the servo controller 14, decodes the data that are rearranged in the error correction buffer memory 35 in a predetermined order, and transmits the decoded data to the system control micro-computer 31.

The system control micro-computer 31 compresses and converts the data received from the decoder 32 into data that conforms to the standard, such as ATRAC3. The system control micro-computer 31 controls the hard disk drive A so as to record the obtained data on the hard disk B in correlation with the identification information previously received from the serve controller 14.

In this manner, the program data on the optical disc 12 is stored on the hard disk B in accordance with the user's manipulation of the recording instruction button.

When the user manipulates the source select button provided for the operation/display section 5 and designates the hard disk B, the program data stored on the hard disk B is reproduced.

When the user selects the hard disk B by manipulating the source select button, the operation/display section 5 transmits the operation signal to the system control micro-computer 31. Then, the system control micro-computer 31 controls the hard disk drive A to reproduce the program data stored on the hard disk B. The reproduced program data is then transmitted to the decoder 32, whereat an MP3 decoder 33 expands the program data and a DAC 34 outputs the expanded program data to an amplifier (not shown), or converts the expanded program data and outputs the resultant data to the amplifier (not shown).

In this manner, the program data stored on the hard disk B is reproduced.

When the user manipulates the source select button to designate the hard disk B and further manipulates the erase button, the process for obtaining the reproduction frequency information is initiated in order to request that the user select program data to be erased from the hard disk B.

Figure 2A:
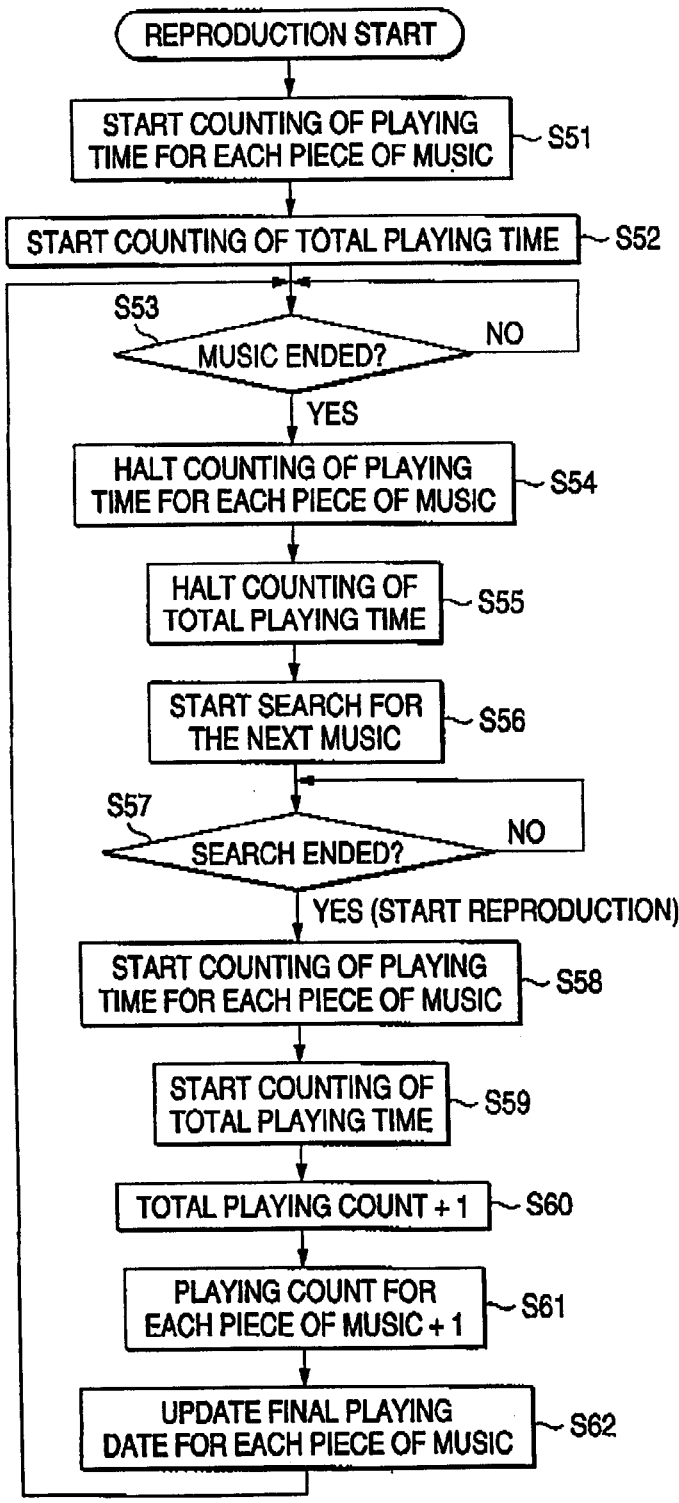
FIGS. 2A and 2B are flowcharts for explaining the processing performed for the embodiment.
Figure 2B:
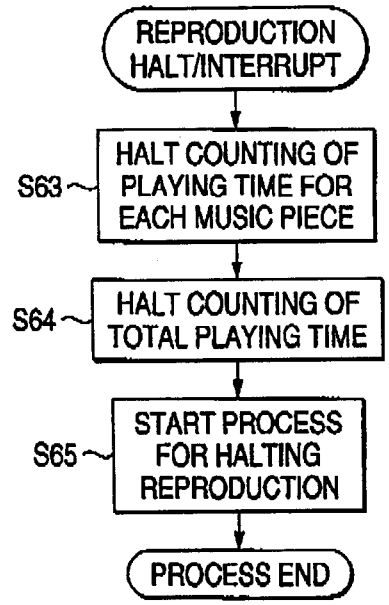

The processing performed to obtain a variety of information that is required to calculate the reproduction frequency information, is to be described referring to the flowchart in FIGS. 2A and 2B. For this processing, the program data referred to during the explanation will be music content.

As is shown in the flowchart in FIG. 2A, when the reproduction of music data stored on the hard disk B is initiated by the hard disk drive A, the system control micro-computer 31 begins to calculate the time required for the playing of the music represented by the music data (step S51). Then, the system control micro-computer 31 records, in a file folder formed for each set of music data, data designating the playing time required for the reproduction of the music data.

As is described above, the music data, the correlated identification data and the recording date are recorded in the file folder. Further, when the file folder is formed, "0" is set as the default value for both the required playing time and the number of times the music has been played.

Each time the music is played by reproducing the music data stored on the hard disk B, the system control micro-computer 31 employs a counter (not shown) to count the time required for playing and the number of times played. When the time required for reproducing music data along track number "2" is 2 minutes 45 seconds, for this period a time count "2.75" is acquired by the counter and is added to the default value "0" in the file folder, so that the setting is changed to "12.75".

The playing time required for the reproduction of music data (hereinafter referred to as "music playing time") can be obtained by examining the identification information. As is described above, the identification information includes data indicating the playing (reproduction) time, and this data is used to manage the elapsed time each time the music is played. That is, by referring to this data, the system control micro-computer 31 can measure the music playing time, and can increment and record data representing the music playing time.

Next, the system control micro-computer 31 initiates the counting process for the music playing time, and also the addition of the music playing time to time data that is currently stored on the hard disk B up to now (step S52).

The system control micro-computer 31 incorporates a memory (not shown), stored wherein are data for the total playing time (hereinafter referred to as the total playing time), obtained by adding together the music playing times that are designated for the individual file folders, and data for the total playing count (hereinafter referred to as the total playing count), obtained by adding together the playing counts designated for the individual file folders.

Assuming that the music playing time for track number "1", which was previously reproduced, is 3 minutes 30 seconds, "3.50" is set as the time obtained by the counter. And when the music data for track number "2" is reproduced and the music playing time is 2 minutes 45 seconds, "2.75", the time acquired by the counter, is added to the "3.50" that was previously recorded, so that the final recorded time setting is "6.25". Through this processing, it is apparent that 6 minutes 15 seconds is the total playing time for the music data that is currently stored on the hard disk B of the information reproduction apparatus 1.

Following this, a check is performed to determine whether the playing of music has been completed (step S53). If the playing has not yet been completed, the counting of the playing time is continued. But when the playing of the music has been completed, the counting of the playing time for setting the total playing time in the file folder is halted (step S54), as is the counting for the total playing time that is to be set in the internal memory (step S55).

When the user manipulates the track select button to designate the next music data to be reproduced, a search operation is initiated in order to reproduce music data beginning at the head position of the music data (step S56). A check is then performed to determine whether the search operation has been completed (step S57). When it is ascertained that the searching has been completed, the playing of the designated music data is initiated, and as is described above, the counter begins to count the music playing time (step S58) and the total playing time (step S59).

Before the processes at steps S58 and S59 are performed, since there are music data that have already been reproduced, the counter updates the frequency (hereinafter referred to as a music playing count) whereat the file folder for the pertinent music data has been stored. That is, the total playing count stored in the memory of the system control micro-computer 31 is incremented by one (step S60), as is the music playing count (step S61).

In addition to the total playing count, the total playing time indicates the frequency whereat the information reproduction apparatus 1 has reproduced the music data stored on the hard disk B currently. After the reproduction of the music data for track number "1" has been completed, the total playing count setting is "1". And after the reproduction of the music data for track number "2" has been completed, the total playing count setting is incremented by one to "2".

For the setting for the music playing count, as for the setting of the music playing time, the default value "0" is incremented twice and "2" is set.

Further, in the file folder, the date whereat the stored music data was reproduced is set by using the calendar function incorporated in the information reproduction apparatus 1. This date indicates the final playing date, i.e., the latest playing date (year, month and day) is indicated (step S62).

By repeating the processing, data for the cumulative music playing time and the music playing count are obtained for each set of music data (program data), and further, the total playing time and the total playing count up to now are obtained for all the music played by the information processing apparatus. In addition, the final playing date is entered each time the cumulative playing time and playing count are updated, and the latest playing (reproduction) date is set.

As is shown in the flowchart in FIG. 2B, when the end of the music data stored on the hard disk B has not been reached during the reproduction process and the user turns off the power switch or instructs that the reproduction be halted, the counting of the music playing time is also halted (step S63) and the count value is returned to the numerical value held before the counting was begun. Further, the counting of the total playing time to be stored in the memory of the system control micro-computer 31 is halted (step S64), and the count value is returned to the numerical value held before the counting was begun. The reproduction process is then halted (step S65).

As is described above, for the reproduction of music data stored on the hard disk B, the system control micro-computer 31 always monitors the reproduction process to determine whether the music data has been reproduced to its end. That is, when music is not played until the end of the data is reached because the user instructs that the reproduction be halted, neither count is acquired for the music playing time and the total playing time, nor count for the music playing count and total playing count, and the two are not updated. Further, the final playing date is also not updated, so that the date set for the preceding reproduction session is retained.

As a result, even a case wherein a user becomes tired of listening to music and halts the reproduction process before all music data has been reproduced can be coped with, and more accurate information can be provided for the user.

In addition, whether the music data has been reproduced to its end can be determined by monitoring the condition for the reproduction of the identificaiton information. Since the identification information includes not only the elapsed playing time but also the absolute playing time required for a piece of music, when the elapsed playing time equals the absolute playing time, it can be assumed that the playing of the piece of music has been completed.

In this manner, various required information is obtained for the acquisition of reproduction frequency information that is used when a user is requested to select program data for deletion.

An explanation will now be given, while referring to the flowcharts in FIGS. 3 to 5, for the processing for obtaining the reproduction frequency information that is used when a user is requested to select program data for reproduction. For this processing, music content is also employed as the program data.

First, when the user selects the hard disk B by manipulating the source select button provided for the operation/display section 5, and further selects the erasing mode by manipulating the erase button, based on these operation signals, the system control micro-computer 31 prepares display data to permit the user to select an erasing method, and displays the data on the display unit provided for the operation/display section 5.

Figure 3:
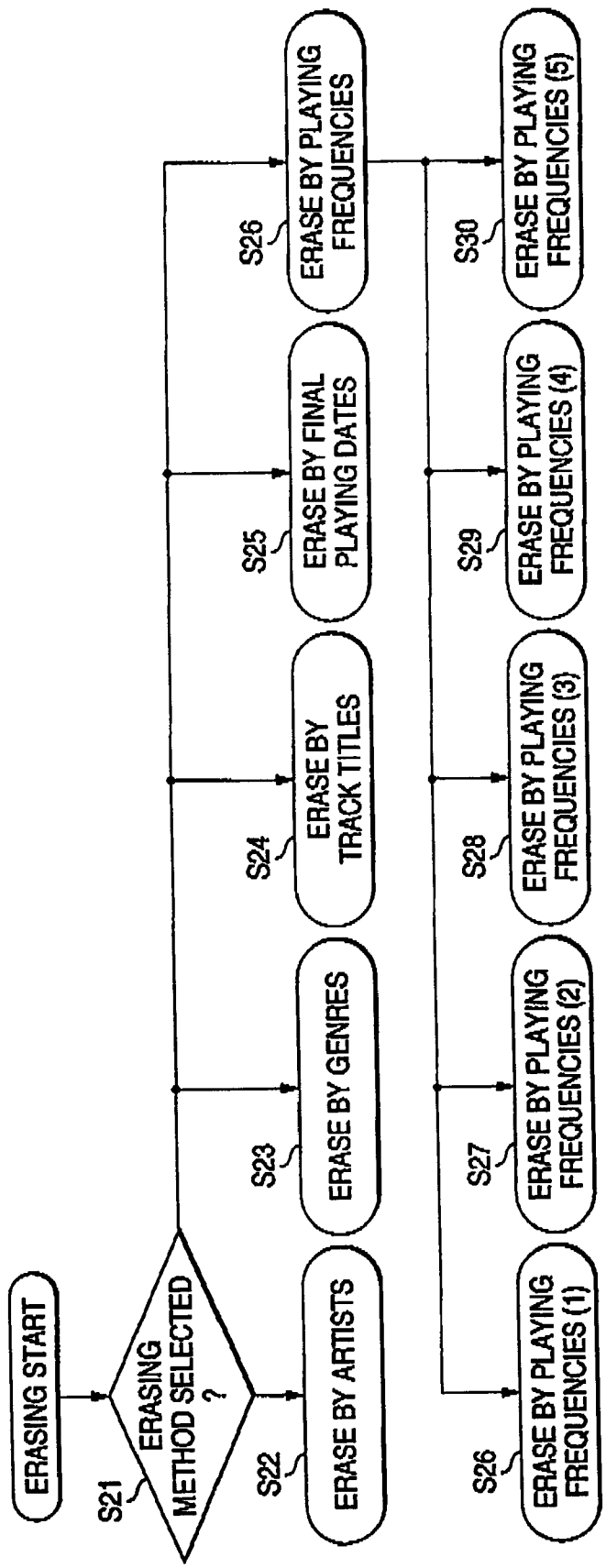
FIG. 3 is a flowchart for explaining the processing performed for the embodiment.

As is shown in FIG. 3, the erasing methods that can be selected by the user are roughly sorted into five categories: the "erasing method by artists", the "erasing method by genres", the "erasing method by track titles", the "erasing method by final playing dates" and the "erasing method by playing frequencies". Also, the "erasing method by playing frequencies" is further sorted into five sub-categories: the "erasing method using the ratio of the playing time", the "erasing method using the ratio of the playing count", the "erasing method using the ratio of the recent listening frequency", the "erasing method using the ratio of the listening frequency in the past" and the "erasing method using the ratio of the playing count within a predetermined period of time".

The user manipulates the select button provided for the operation/display section 5 to select one of the five initial categories, and the system control micro-computer 31 determines which erasing method has been selected (step S21).

1. Processing When "Erasing Method by Genres" is Selected

Figure 4:
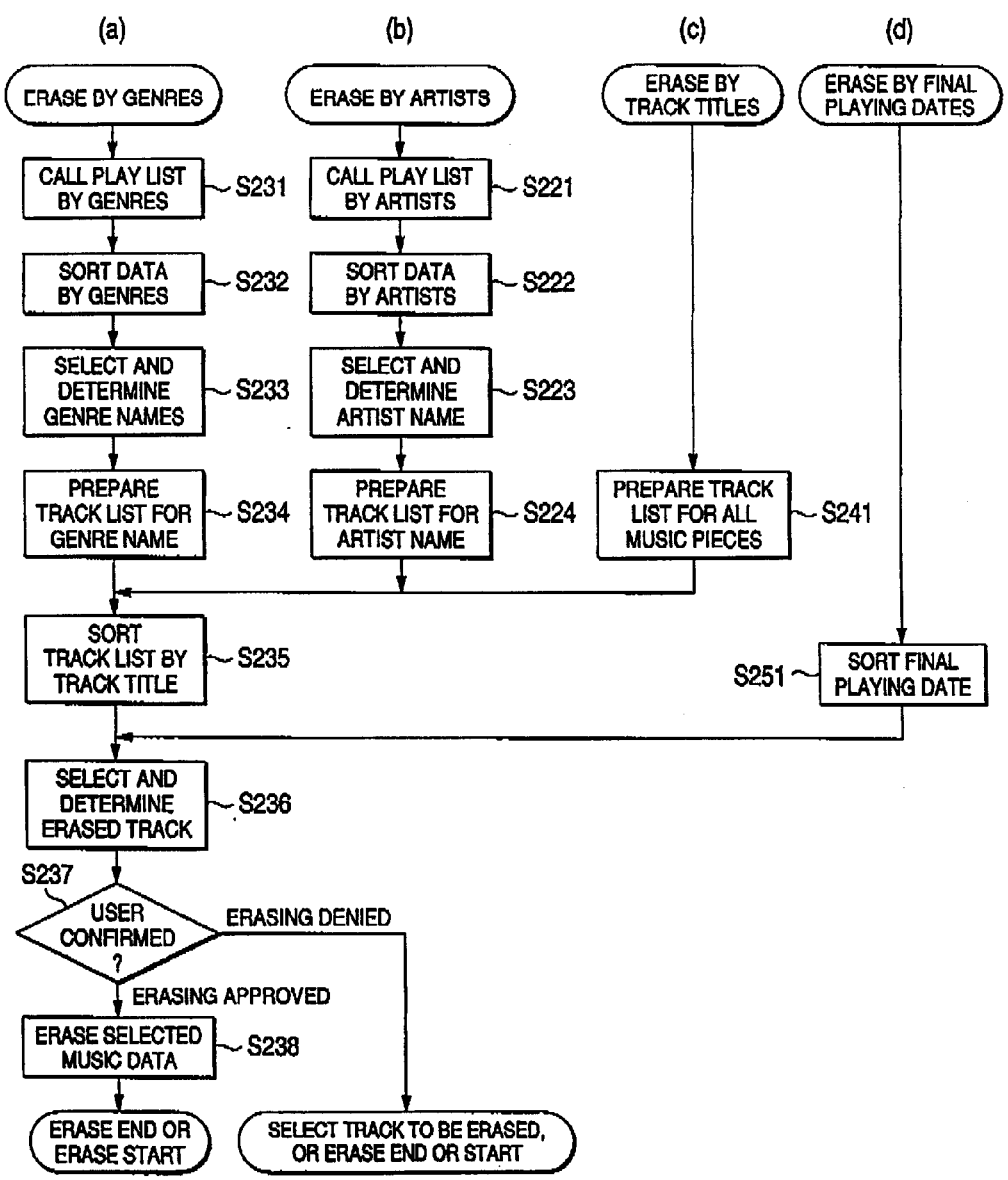
FIG. 4 is a flowchart for explaining the processing performed for the embodiment.

When the user selects the "erasing method by genres" (step S23), the system control micro-computer 31 shifts from the processing in FIG. 3 to the processing (a) in FIG. 4, and initiates the processing.

Here, "genre" represents the type of music data, such as pops, jazz, classics, enka (Japanese popular ballads) or rock. Data indicating these types are text data, and are stored, in a correlation with identification information for identifying music data, in a folder other than a file folder for storing music data.

The text data is obtained by using a communication line, such as the Internet. That is, the identification information for identifying the music data is transmitted to an external DB wherein text data indicating the genre, the artist and the music name (track title) is stored, and the relevant attribute data corresponding to the identification data is obtained from the external DB and is stored in the file folder.

The user can also prepare text data indicating the original genre or artist by manipulating the operation key provided for the operation unit, and may then store the text data in the folder.

First, the system control micro-computer 31 calls the text data (hereinafter referred to as a genre name) that is stored on the hard disk B and indicates the genre, and prepares the display data (step S231).

The text data is sorted by genre name (step S232). For example, when the Japanese syllabary order is employed and when the text data sets include the same genre name "enka (Japanese popular ballad)", i.e., have genre "enka 1", "enka 2" and "enka 3", the text data are sorted in the ascending order of the numbers attached to the genre name.

The user selects a desired genre name from among the sorted genre names (step S233). Then, the system control micro-computer 31 calls for, from the folder, text data that represents the music title (track title) corresponding to the selected genre name, converts the text data into display data, and generates a music title list (track list) (step S234). When the data is to be displayed on the display unit provided for the operation/display section 5, the music titles (track titles) are sorted (step S235).

The user selects a desired music title (track title) from among the sorted music titles (track titles) (step S236). A check is then performed to determine whether the user has confirmed the erasing of the music data corresponding to the selected music title (track title) (step S237). That is, a check is performed to determine whether the user has manipulated the decision button provided for the operation/display section 5.

When it is ascertained that the decision button has been manipulated, i.e., when a signal instructing the erasure is transmitted by the operation/display section 5, the system control micro-computer 31 controls the hard disk drive A to delete the pertinent music data from the hard disk B. Then, the erasing node is released, and the erasing process is terminated.

When the decision button is not manipulated, i.e., when the decision button is not operated after a predetermined time has elapsed following the selection of a desired music title by the user, the music title (track title) selected by the user is regarded as invalid, and the user is again requested to select a music title. Or the erasing mode is released, and the erasing process is terminated.

The erasing process is performed in this manner when the erasing process selected by the user is "erasing method by genres". During this processing, the user can designate the genre name that is to be deleted and can perform a hierarchically search for the music data.

2. Processing Performed When "Erasing Method by Artists" is Selected

When the user selects the "erasing method by artists" from among the five categories in FIG. 3 (step S22), the system control micro-computer 31 shifts the processing to the processing (b) in FIG. 4, and begins this processing.

An "artist" may be a player of instrumental music or a singer. The data designating the artist is text data, and is stored, in correlation with corresponding identification information, in a folder other than the file folder for storing the music data.

The text data is obtained by using a communication line, such as the Internet. That is, the identification information for identifying the music data is transmitted to an external DB wherein text data indicating the genre, the artist and the music name (track title) is stored, and the attribute data corresponding to the identification information is obtained from the external DB and stored in the file folder.

The user can also prepare text data indicating the original genre or artist by manipulating the operation key provided for the operation unit, and can store the text data in the folder.

First, the system control micro-computer 31 calls for the text data (hereinafter referred to as an artist name) that is stored on the hard disk B and designates the artist, and prepares the display data (step S221).

The text data is sorted by artist name (step S222). For example, when the alphabetical order is employed and when the text data sets include the same artist name "XYZ", i.e., include artist name "XYZ1", "XYZ2" and "XYZ3", the text data are sorted in the ascending order of the numbers attached to the artist name.

The user selects a desired artist name from among the sorted artist names (step S223). Then, the system control micro-computer 31 calls up, from the folder, text data that represents the music title (track title) corresponding to the selected artist name, converts the text data into display data, and generates a music title list (track list) (step S224).

The system control micro-computer 31 then performs the processing from step S235 to step S238.

The erasing process is performed in this manner when the "erasing method by artists" is selected by the user. That is, the user can designate the artist name that is to be deleted and hierarchically search for music data.

3. Processing Performed When "Erasing Method by Track Titles" is Selected

When the user selects the "erasing method by track titles" from the among the five categories in FIG. 3 (step S24), the system control micro-computer 31 shifts the process to the processing (c) in FIG. 4.

The "track title" is the music title provided for corresponding identification information (a track number) to identify music data. The data for the track title is text data, and is stored, in correlation with the identification information, in a folder other than the file folder for storing the music data.

The text data is obtained by using a communication line, such as the Internet. That is, the identification information for identifying the music data is transmitted to an external DB wherein text data indicating the genre, the artist and the music name (track title) is stored, and attribute data corresponding to the identification information is obtained from the external DB and is stored in the file folder.

The user can also prepare text data indicating the original genre or artist, by manipulating the operation key provided for the operation unit, and can store the text data in the folder.

First, the system control micro-computer 31 calls up the text data (hereinafter referred to as a track title name) that is stored on the hard disk B and indicates all the track titles, and prepares the display data (step S241).

The system control micro-computer 31 then performs the processing from step S235 to step S238.

The erasing process is performed in this manner when the "erasing method by track titles" is selected by the user. That is, when the user knows the music title of music data that is to be deleted, the user can search for the music title directly, without designating a genre name or an artist name.

4. Processing Performed When "Erasing Method by Final Playing Dates" is Selected When a user selects the "erasing method by final playing dates" from among the five categories in FIG. 3 (step S25), the system control micro-computer 31 shifts from the process in FIG. 3 to the processing (d) in FIG. 4, and begins the processing.

As is described above, the "final playing date" is the final playing date, recorded in the file folder, for the latest reproduction of the music data.

First, the system control micro-computer 31 calls up the data indicating the final playing date from all the file folders on the hard disk B, and prepares the display data. When the display data are to be presented on the display unit provided for the operation/display section 5, the display data are sorted by year, month and day (step S251).

The system control micro-computer 31 performs the process of from steps S236 to S238.

The erasing process is performed in this manner when the user has selected the "erasing method by final playing dates". That is, when the user desires to employ the final playing date as a reference for the selection of music data to be deleted, the user need only select the "erasing method by final playing dates" category to easily perform a search for music data to be deleted.

5. Processing Performed When "Erasing Method by Playing Frequencies" is Selected When the user selects the "erasing method by playing frequencies" from among the five categories in FIG. 3 (step S26), the system control micro-computer 31 prepares display data indicating the five sub-categories, and presents the data on the display unit provided for the operation/display section 5.

Figure 5:
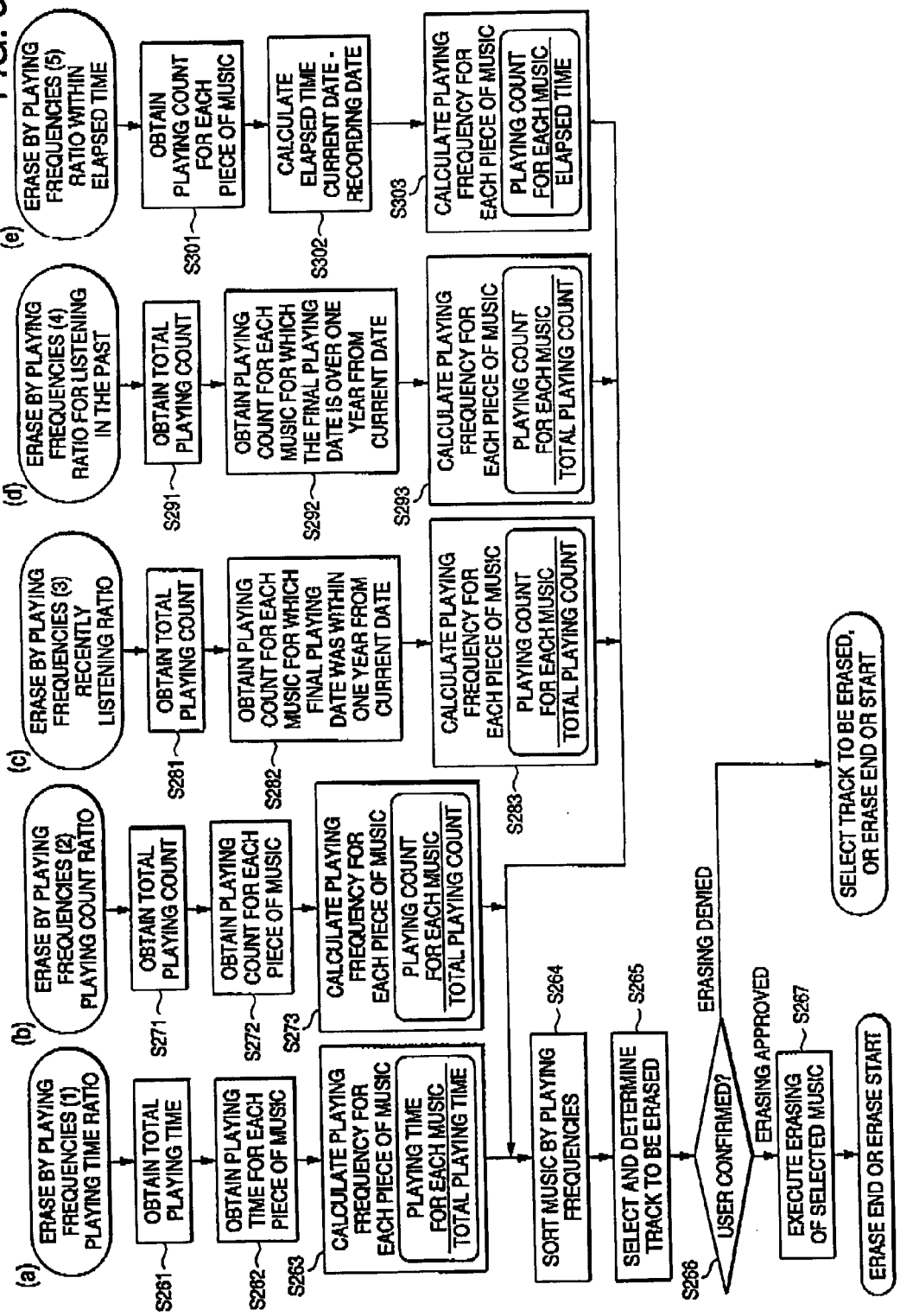
FIG. 5 is a flowchart for explaining the processing performed for the embodiment.

6.1 Processing Performed When "Erasing Method Using the Ratio of a Playing Time" is Selected When the user selects the "erasing method using the ratio of a playing time" from among the five sub-categories in FIG. 3 (step S260), the system control micro-computer 31 shifts from the process in FIG. 3 to the processing (a) in FIG. 5 and begins the processing.

First, the system control micro-computer 31 obtains data indicating the total playing time recorded in the memory (step S261), and obtains the data for the music playing time from each file folder formed on the hard disk B, i.e., for each music data sets (step S262).

The system control micro-computer 31 calculates the playing time ratio for each music data set by using the obtained data that represents the total playing time and the data that is obtained for each music data set and that indicates the total music playing time. Assuming that the data for the music playing time stored in the file folder A is "10" (ten minutes) and the data for the total playing time is "100" (100 minutes), the playing time ratio is calculated as:

(Music playing time/Total playing time)·100=(10/100)·100=10%.

This means that the music data stored in the file folder A has been reproduced over a period that constitutes 10% of the total playing time.

Further, assuming that the data for the music playing time stored in the file folder B is "20.50" (20 minutes 30 seconds) and the data for the total playing time is "100" (100 minutes), the playing time ratio is calculated as:

(Music playing time/Total playing time)·100=(20.50/100)·100= 20.5%.

This means that the music data stored in the file folder B has been reproduced over a period constituting 20.5% of the total playing time.

That is, when the playing time for the music data stored in the file folder A is compared with the playing time for the music data stored in the file folder B, it is apparent that the reproduction time for the music data stored in the file folder B is greater (employed).

When there is a file folder in which the data "2.00" (two minutes) is stored for the music playing time, so long as the total playing time is "2.00" (two minutes), it can be determined that the frequency of the reproduction of the music data stored in the pertinent file folder is high.

The system control micro-computer 31 sorts, in the ascending or descending order of the frequencies, the playing time ratios that are calculated for the individual music data sets, and prepares display data (step S264).

To generate the display data, the identification information is called up from the file folder, and is correlated with the data representing the playing time ratio.

Then, the user selects identification information (e.g., a track number) to be deleted, while referring to the data indicating the playing time ratio (step s264).

The system control micro-computer 31 determines whether the erasure of music data corresponding to the selected identification information is to be performed (step S266). That is, the system control micro-computer 31 determines whether the user has manipulated the decision button provided for the operation/display section 5.

When it is ascertained that the user has manipulated the decision button, i.e., when an erase signal is supplied by the operation/display section 5, the system control micro-computer 31 controls the hard disk drive A to erase the pertinent program data from the hard disk B. Thereafter, the erasing mode is released and the erasing processing is terminated.

When it is ascertained that the user has not manipulated the decision button, or when the user does not manipulate the decision button after a predetermined time has elapsed since the user selected the desired identification information, the identification information selected by the user is regarded as invalid, and the user is requested to re-select the identification information. Or the erasing mode is released and the erasing processing is terminated.

The erasing processing is performed in this manner when the user selects the sub-category "erasing method using the playing time ratio". That is, when the user desires to employ the listening time as a reference to select music data to be deleted, the user need only select the "erasing method using the playing time ratio" in order to request the user to select the music data that is to be deleted.

6.2 Processing Performed When "Erasing Method Using a Playing Count" is Selected When the user selects the "erasing method using a playing count" from among the five sub-categories in FIG. 3 (step S27), the system control micro-computer 31 shifts to the process in FIG. 3 to the processing (b) in FIG. 5 and initiates the processing.

First, the system control micro-computer 31 obtains the total playing count data that is stored in the internal memory (step S271), and then obtains the data from all the file folders for the music playing count (individual music data sets) (step S272).

The system control micro-computer 31 calculates, for each music data set, the playing count ratio by using the obtained data for the total playing count and the data for the music playing count that is obtained for each music data set. Assuming that the data for the music playing count stored in the file folder A is "10" (ten times) and the data for the total playing count is "100" (100 times), the playing count ratio is calculated as:

(Music playing count/Total playing count)·100=(10/100)·100=10%.

This means that the music data stored in the file folder A has been reproduced the number of times that constitutes 10% of the total playing count.

Further, assuming that the data for the music playing count stored in the file folder B is "20" (20 times) and the data for the total playing count is "100" (100 times), the playing count ratio is calculated as:

(Music playing count/Total playing count)·100=(20/100)·100=20%.

This means that the music data stored in the file folder B has been reproduced the number of times that constitutes 20% of the total playing count.

That is, when the playing count for the music data stored in the file folder A is compared with the playing count for the music data stored in the file folder B, it is apparent that the music data stored in the file folder B has been reproduced (employed) more frequently.

When there is a file folder in which the data "1" (one time) is stored for the music playing count, so long as the total playing count is "1" (one time), it can be determined that the frequency of reproduction of the music data stored in the pertinent file folder is high.

Then, the system control micro-computer 31 performs steps S264 to S267.

The music data to be erased can be selected by comparing the "erasing method using a playing time ratio" with the "erasing method using a playing count ratio". When the user selects the "erasing method using a playing time count" and the "erasing method using a playing count ratio" from the five sub-categories, the system control micro-computer 31 performs in parallel the processing (a) in FIG. 5 and the processing (b) in FIG. 5.

Following this, display data are generated, by correlating, with the identification information, the data for the playing time ratio and the data for the playing count ratio, and displayed on the display unit provided for the operation/display section 5.

Assume that relative to the music data stored in the file folder A, the playing time ratio is 9%, the playing count ratio is 90% and that relative to the music data stored in the file folder B the playing time ratio is 10% and the playing count ratio is 10%. These data are displayed by correlating them with the identification information stored in the file folder A and the identification information stored in the file folder B.

By referring to the data on the display, the user can ascertain that music for the music data stored in the file folder A was played over a period constituting 10% of the total playing time of 100 minutes, i.e., for ten minutes. Also, since the playing count ratio is 10%, the user can ascertain that this music data was played only once out of a total playing count of 10. Further, the user can ascertain that the music for the music data stored in the file folder B was played over a period that constitutes 9% of the total playing time of 100 minutes, i.e., for nine minutes. Also, since the playing count ratio is 90%, the user can also ascertain that this music data was played nine times out of a total playing count of 10.

Since the two erasing methods are performed in parallel, the user is permitted to compare music data having a high playing frequency, by referring to the playing time ratio (in this example, music data stored in the file folder A), with music data that having a high playing frequency by referring to the playing count ratio (in this example, music data stored in the file folder B), and to request the user to select the music data to be erased.

6.3 Processing Performed When "Erasing Method Using the Recently Listening Ratio" is Selected When the user selects the "erasing method using the recently listening ratio" from among the five sub-categories in FIG. 3 (step S28), the system control micro-computer 31 shifts from the process in FIG. 3 to the processing (c) in FIG. 5 and initiates the processing.

First, the system control micro-computer 31 obtains the total playing count data from the internal memory (step S281), and obtains the data, from all the file folders indicating the final playing date formed in the hard disk B (for individual music data sets). The system control micro-computer 31 then refers to the calendar function (not shown) incorporated in the information processing apparatus to determine whether the obtained data for the final playing date is within one year of the current date. The system control micro-computer 31 then selects a file folder for which the final playing date is within one year of the current date and obtains, from the selected file folder, data indicating the music playing count (step S282).

The system control micro-computer 31 calculates the playing count ratio for each music data set by using the obtained total playing count data and the music playing count data obtained for the selected music data (step S283). Assuming that the data for the music playing count stored in the file folder A is "1" (once) and the data for the total playing count is "100" (100 times), the playing count ratio is calculated as:

(Music playing count/Total playing count)·100=(1/100)·100=1%.

This represents the ratio of the number of times whereat the music data stored in the file folder A was reproduced during one year.

Further, assuming that the data for the music playing count stored in the file folder B is "50" (50 times) and the data for the total playing count is "100" (100 times), the playing count ratio is calculated as:

(Music playing count/Total playing count)·100=(50/100)·100=50%.

This is the ratio of the number of times whereat the music data stored in the file folder B was reproduced during one year.

That is, when the playing count for the music data stored in the file folder A is compared with the playing count for the music data stored in the file folder B, it is apparent that the music data stored in the file folder B was is reproduced (employed) more frequently.

Then, the system control micro-computer 31 performs steps S264 to S267.

The erasing process is performed in this manner when the user selects the sub-category "erasing method using the recently listening ratio". That is, when the user desires to employ, as a reference, the number of times music has recently been listened to for the selection of music data to be deleted, the user need only select the "erasing method using the recently listening count".

6.4 Processing Performed When "Erasing Method Using the Ratio for Listening in the Past" is Selected When the user selects the "erasing method using the ratio for listening in the past" from among the five sub-categories in FIG. 3 (step S29), the system control micro-computer 31 shifts from the process in FIG. 3 to the processing (d) in FIG. 5 and initiates the processing, First, the system control micro-computer 31 obtains the total playing count data from the internal memory (step S291), and obtains the data from all the file folders indicating the final playing date formed on the hard disk B (for individual music data sets). The system control micro-computer 31 refers to the calendar function (not shown) incorporated in the information processing apparatus to determine whether the obtained data for the final playing date indicates a period that is greater than one year from the current date. Then, the system control micro-computer 31 selects a file folder for which the final playing date that is greater than one year from the current date, and obtains, from the selected file folder, data indicating the music playing count (step S292).

The system control micro-computer 31 calculates the playing count ratio for each music data set by using the obtained total playing count data and the music playing count data obtained for the selected music data (step S293). Assuming that the data for the music playing count stored in the file folder A is "30" (thirty times) and the data for the total playing count is "100" (100 times), the playing count ratio is calculated as:

(Music playing count/Total playing count)·100=(30/100)·100=30%.

This represents the ratio of the number of times whereat the music data stored in the rile folder A was reproduced over one year ago.

Further, assuming that the data for the music playing count stored in the file folder B is "50" (50 times) and the data for the total playing count is "100" (100 times), the playing count ratio is calculated as:

(Music playing count/Total playing count)·100=(50/100)·100=50%.

This means the ratio of the number of times whereat the music data stored in the file folder B was reproduced over one year ago.

That is, when the music data stored in the file folder A is compared with the music data stored in the file folder B, it is apparent that over one year ago the music data stored in the file folder B was reproduced (employed) more frequently.

Then, the system control micro-computer 31 performs steps S264 to S267.

The erasing process is performed in this manner when the user selects the sub-category "erasing method using the ratio for listening in the past". That is, when the user desires to employ, as a reference, the number of times music was listened to in the past to select music data to be deleted, the user need only select the "erasing method using the ratio for listening in the past".

6.5 Processing Performed When "Erasing Method Using the Ratio of a Playing Count Within an Elapsed Period of Time" is Selected When the user selects the "erasing method using the ratio of a playing count within an elapsed period of time" from among the five sub-categories in FIG. 3 (step S30), the system control micro-computer 31 shifts from the process in FIG. 3 to the processing (e) in FIG. 5 and initiates the processing.

First, the system control micro-computer 31 obtains from the all the file folders the playing count data and the data for the recording date for each file folder formed on the hard disk B (for individual music data sets) (step S301). The system control micro-computer 31 refers to the calendar function (not shown) incorporated in the information processing apparatus, and decrements from the current date to the recording date to obtain the number of days (hereinafter referred to as an elapse time) that have elapsed since the date set in the file folder for each music data set was stored (step S302).

The system control micro-computer 31 employs the obtained playing count data and the elapsed time data to calculate, for each music data set, the ratio of a playing count to the elapsed time (step S303). Assuming that the data for the music playing count stored in the file folder A is "30" (thirty times) and the data for the elapsed time is "30" (30 days), the playing count ratio is calculated as:

(Music playing count/Elapsed time)·100=(30/30)·100 =100%.

This represents the ratio of the number of times whereat the music data was reproduced since the data in the file folder A was recorded on the hard disk B.

In this case, it is assumed that the data was played once a day, and the playing frequency for the pertinent music data is high.

Further, assuming that the data for the music playing count stored in the file folder B is "50" (50 times) and the data for the elapsed time is "2" (2 days), the playing count ratio is calculated as:

(Music playing count/Elapsed time)·100=(50/2)·100=250%.

This is the ratio of the number of times whereat the music data was reproduced since the data on the file folder B was recorded on the hard disk B.

That is, when the playing count ratio for the music data stored in the file folder A is compared with that for the music data stored in the file folder B, it is apparent that the music data stored in the file folder B has been reproduced (employed) more frequently since it was recorded on the hard disk.

Then, the system control micro-computer 31 performs steps S264 to S267.

The erasing process is performed in this manner when the user selects the sub-category "erasing method using the ratio of a playing count within the elapsed time". That is, when the user desires to select music data to be deleted by employing, as a reference, the number of times that the user has listened to the music since it was recorded on the hard disk, the user need only select the "erasing method using the ratio of a playing count within the elapsed time".

Further, the user may be permitted to perform in parallel a plurality of the five sub-categories and to select music to be deleted. In the embodiment, the parallel processing for the "erasing method using a playing time ratio" and the "erasing method using a playing count ratio" has been explained as an example. However, the user may also be permitted to perform the parallel processing by combining several of the five sub-categories.

Furthermore, in this embodiment, the program data on the optical disc 12 is recorded on to the hard disk B. However, program data may be downloaded through a communication line, such as the Internet, to the hard disk B.

In the embodiment, the reproduction frequency has been calculated when the user selects the erasing method. However, the reproduction frequency information may be calculated in advance for each program data set, and may be stored in a file folder. When, for example, the user designates the erase mode by manipulating the erase button, all the erasing methods are performed and the obtained reproduction frequency information is stored in the file folder. When the erasing method is selected, information pertinent to the selected erasing method is displayed on the display unit.

As is described above, since the reproduction frequency information for the program data on the hard disk B is calculated by employing a variety of viewpoints, selection of the music data to be deleted can be required of the user. Therefore, even when a shortage of available memory capacity on the hard disk B occurs, the user need only refer to the reproduction frequency information to immediately delete unnecessary program data and obtain additional free space. As a result, program data, such as the latest music content, can be quickly recorded on the hard disk.

In the embodiment of this invention, the reproduction section 2 has been explained as one of the configuration for the information processing apparatus of the invention. However, this section is merely an example source for recording, on a hard disk, program data, such as a music content, stored on a recording medium such as a CD. Only the recording reproduction section 3, the control section 4 and the operation/display section 5 are required in order to calculate information, such as reproduction frequency, that serves as an index for erasing program data, and to permit the user to efficiently select and erase program data from the hard disk.

As is described above, according to the present invention, information, such as reproduction frequency, that serves as an index for erasing program data can be calculated, and based on this information, a user is permitted to efficiently select program data to be deleted from the hard disk. Therefore, the user need only examine the reproduction frequency information to efficiently select program data to be deleted. Therefore, a great labor and a great deal of time are not required to search for program data to be erased. Further, even when the memory capacity of a hard disk runs low, the user can immediately select and erase unnecessary program data, and can quickly record, on the hard disk, such program data as the latest music content.

What is claimed is:

1. An information reproduction apparatus comprising:

reproduction means for reproducing a plurality of program data on a recording medium on which stored are the program data and identification information for the program data;

erasing means for erasing one of the program data from the recording medium;

reproduction frequency calculation means for calculating reproduction frequency information for each of the program data by employing a variety of information obtained by reproducing each of the program data; and control means for displaying, at least, the identification information and the reproduction frequency information, and for controlling the erasing means to erase from the recording medium the program data identified by referring to an identification information selected by a user.

2. The information reproduction apparatus according to claim 1, wherein the variety of information includes:

reproduction time data obtained by addition of each of the program data each time the program data is reproduced by the reproduction means; and total reproduction time data obtained by adding the reproduction time data.

3. The information reproduction apparatus according to claim 1, wherein the variety of information includes:

reproduction count data obtained by addition of data, for each of the program data, each time the program data is reproduced by the reproduction means; and total reproduction count data obtained by adding the reproduction count data.

4. The information reproduction apparatus according to claim 2, wherein the reproduction frequency calculation means employs the reproduction time data and the total reproduction time data to obtain a reproduction time ratio for each of the program data.

5. The information reproduction apparatus according to claim 3, wherein the reproduction frequency calculation means employs the reproduction count data and the reproduction count total to obtain the reproduction count ratio for each of the program data.

6. The information reproduction apparatus according to claim 2, wherein the reproduction time data is obtained by incrementation of the program data up to the final position of the reproduction means.

7. The information reproduction apparatus according to claim 3, wherein the reproduction count data is obtained by incrementation of the program data up to the final position of the reproduction means.

8. A method for erasing program data stored on a recording medium comprising the steps of;

reproducing a plurality of program data to calculate a variety of information;

displaying reproduction frequency information for each of the program data based on the variety of information; and erasing from the recording medium the program data selected by a user employing the reproduction frequency information.

9. The method according to claim 8, wherein the variety of information includes:

reproduction time data obtained by addition of each of the program data each time the program data is reproduced; and total reproduction time data obtained by adding the reproduction time data.

10. The method according to claim 8, wherein the variety of information includes:

reproduction count data obtained by addition of data, for each of the program data, each time the program data is reproduced; and total reproduction count data obtained by adding the reproduction count data.

11. The method according to claim 9, further comprising a step of calculating a reproduction time ratio for each of the program data, based on the reproduction time data and the total reproduction time data.

12. The method according to claim 10, further comprising a step of calculating a reproduction count ratio for each of the program data, based on the reproduction count data and the reproduction count total.

13. The method according to claim 9, wherein the reproduction time data is obtained by incrementation of the program data up to the final position of the reproduction means.

14. The method according to claim 10, wherein the reproduction count data is obtained by incrementation of the program data up to the final position of the reproduction means.

15. An information reproduction apparatus comprising:
- a recording/reproducing unit for reproducing a plurality of program data on a recording medium on which stored are the program data and identification information for the program data;
- an operation/display unit for displaying the identification information and reproduction frequency information, and allowing an user to select one of the program data to be deleted; and
- an controller for controlling the recording/reproducing unit in accordance with an instruction from the operation/display unit;
- wherein the controller calculates the reproduction frequency information for each of the program data by employing a variety of information obtained by reproducing each of the program data; and
- the controller controls the recording/reproducing unit to erase from the recording medium the program data identified by the operation/display unit.

16. The information reproduction apparatus according to claim 15, wherein the variety of information includes:
- reproduction time data obtained by addition of each of the program data each time the program data is reproduced by the recording/reproducing unit; and
- total reproduction time data obtained by adding the reproduction time data.

17. The information reproduction apparatus according to claim 15, wherein the variety of information includes:
- reproduction count data obtained by addition of data, for each of the program data, each time the program data is reproduced by the recording/reproducing unit; and
- total reproduction count data obtained by adding the reproduction count data.

18. The information reproduction apparatus according to claim 16, wherein the controller employs the reproduction time data and the total reproduction time data to obtain a reproduction time ratio for each of the program data.

19. The information reproduction apparatus according to claim 17, wherein the reproduction frequency calculation means employs the reproduction count data and the reproduction count total to obtain the reproduction count ratio for each of the program data.

20. The information reproduction apparatus according to claim 16, wherein the reproduction time data is obtained by incrementation of the program data up to the final position of the recording/reproducing unit.

21. The information reproduction apparatus according to claim 17, wherein the reproduction count data is obtained by incrementation of the program data up to the final position of the recording/reproducing unit.

* * * * *